(12) United States Patent
Elvira et al.

(10) Patent No.: US 11,227,165 B2
(45) Date of Patent: Jan. 18, 2022

(54) AUTOMATIC LIGHTING AND SECURITY DEVICE

(71) Applicant: NETATMO, Boulogne-Billancourt (FR)

(72) Inventors: David Elvira, Palaiseau (FR); Mehdi Felhi, Suresnes (FR); Frédéric Potter, Neuilly sur Seine (FR); Pauline Luc, Paris (FR); Kelvin Moutet, Montrouge (FR)

(73) Assignee: NETATMO, Boulogne-Billancourt (FR)

( * ) Notice: Subject to any disclaimer, the term of this patent is extended or adjusted under 35 U.S.C. 154(b) by 360 days.

(21) Appl. No.: 16/067,920

(22) PCT Filed: Jan. 4, 2017

(86) PCT No.: PCT/EP2017/050111
§ 371 (c)(1),
(2) Date: Jul. 3, 2018

(87) PCT Pub. No.: WO2017/118647
PCT Pub. Date: Jul. 13, 2017

(65) Prior Publication Data
US 2020/0274997 A1    Aug. 27, 2020

(30) Foreign Application Priority Data
Jan. 4, 2016 (FR) ..................... 1650016

(51) Int. Cl.
*H04N 9/47* (2006.01)
*G06K 9/00* (2006.01)
(Continued)

(52) U.S. Cl.
CPC ..... *G06K 9/00791* (2013.01); *G06K 9/00771* (2013.01); *G06K 9/209* (2013.01);
(Continued)

(58) Field of Classification Search
CPC ...... H04N 5/2256; H04N 7/183; G06K 9/209; G06K 9/00771; G06K 9/628;
(Continued)

(56) References Cited

U.S. PATENT DOCUMENTS

| 6,192,155 B1 * | 2/2001 | Fan ......................... G06T 9/00 382/232 |
| 8,107,680 B2 * | 1/2012 | Henson ............ G08B 13/19673 382/103 |

(Continued)

FOREIGN PATENT DOCUMENTS

| CN | 101930653 A | 12/2010 |
| CN | 102118554 A | 7/2011 |

(Continued)

OTHER PUBLICATIONS

English Translation of Korean Office Action issued in KR application 10-20187022541, dated Aug. 13, 2019.

(Continued)

*Primary Examiner* — Howard D Brown, Jr.
(74) *Attorney, Agent, or Firm* — Meagher Emanuel Laks Goldberg & Liao, LLP

(57) ABSTRACT

In a number of aspects, the invention discloses a device (100) comprising one or more infrared light sources (40, 41); one or more visible light sources (50, 51); an image sensor (10); a processing unit (20) configured to analyze a series of images of a region of interest output by the image sensor; a control unit (30) configured to generate one or more of an activation of the one or more visible light sources or an alarm based on a command received from the processing unit; wherein the analyze comprises detecting a moving foreground in the series of images of the region of interest, tracking one or more characterizing features in the moving foreground and classifying the one or more characterizing features into two of more types of objects of interest, a type (Continued)

of an object of interest determining a command sent by the processing unit to the control unit.

14 Claims, 9 Drawing Sheets

(51) Int. Cl.
    *G06T 7/246*     (2017.01)
    *G06K 9/20*     (2006.01)
    *G06K 9/62*     (2006.01)
    *G08B 13/196*     (2006.01)
    *H04N 5/225*     (2006.01)
    *H04N 7/18*     (2006.01)
    *H05B 47/125*     (2020.01)

(52) U.S. Cl.
    CPC ......... *G06K 9/2018* (2013.01); *G06K 9/6201* (2013.01); *G06K 9/628* (2013.01); *G06T 7/246* (2017.01); *G08B 13/19606* (2013.01); *H04N 5/2256* (2013.01); *H04N 7/183* (2013.01); *H05B 47/125* (2020.01); *G06T 2207/10048* (2013.01); *G06T 2207/20084* (2013.01); *G06T 2207/30232* (2013.01)

(58) Field of Classification Search
    CPC .... G06K 9/2018; G06K 9/6201; G06T 7/246; G06T 2207/20084; G06T 2207/10048; G06T 2207/30232; G08B 13/19606
    See application file for complete search history.

(56) References Cited

U.S. PATENT DOCUMENTS

| | | | |
|---|---|---|---|
| 9,215,781 B2* | 12/2015 | Marman | G08B 13/19613 |
| 9,436,692 B1* | 9/2016 | Fang | G06F 16/116 |
| 9,454,819 B1* | 9/2016 | Seetharaman | G06K 9/6277 |
| 2005/0002572 A1* | 1/2005 | Saptharishi | G06T 7/194 |
| | | | 382/224 |
| 2005/0163345 A1* | 7/2005 | van den Bergen | G06K 9/00771 |
| | | | 382/103 |
| 2007/0122000 A1* | 5/2007 | Venetianer | G06K 9/00771 |
| | | | 382/103 |
| 2007/0183661 A1* | 8/2007 | El-Maleh | G06K 9/3233 |
| | | | 382/173 |
| 2009/0262189 A1 | 10/2009 | Marman | |
| 2011/0164133 A1 | 7/2011 | Chang | |
| 2013/0329987 A1* | 12/2013 | Gong | G06T 7/11 |
| | | | 382/159 |
| 2014/0125813 A1 | 5/2014 | Holz | |
| 2015/0062337 A1* | 3/2015 | Scalisi | G08B 13/19632 |
| | | | 348/143 |
| 2018/0048894 A1* | 2/2018 | Chen | G06T 5/50 |
| 2019/0114804 A1* | 4/2019 | Sundaresan | G06K 9/66 |

FOREIGN PATENT DOCUMENTS

| | | |
|---|---|---|
| CN | 102510480 A | 6/2012 |
| CN | 103975577 A | 8/2014 |
| CN | 104145276 A | 11/2014 |
| CN | 104769644 A | 7/2015 |
| JP | 2003008954 A | 1/2003 |
| JP | 2011-108417 A | 6/2011 |
| KR | 20140067160 A | 6/2014 |
| WO | 2013/109609 A2 | 7/2013 |

OTHER PUBLICATIONS

Chinese Office Action issued in CN application 10, dated Dec. 4, 2019. Only with English translation of Chinese Search Report.
Bouguet ("Pyramidal Implementation of the Lucas Kanade Feature Tracker", Intel Corp. Microprocessor Research Labs, 2000.
Lucas and Kanade, "An Iterative Image Registration Technique with an Application to Stereo Vision", Proceedings of the 7th International Joint Conference on Artificial Intelligence, vol. 2, IJCAI'81, pp. 674-679, 1981.
Shi and Tomasi, "Good Features to Track", 1994 I3E Conference on Computer Vision and Pattern Recognition, CVPR'94, pp. 593-600, 1994.
Girshick and al., "Rich Feature Hierarchies for Accurate Object Detection and Semantic Detection", 2014 I3E Conference on Computer Vision and Pattern Recognition, CVPR 2014, Colombus, OH, USA, pp. 580-587, 2014.
Viola and al.: "Rapid Object Detection Using a Boosted Cascade of Simple Features", 2001 I3E, Computer Society Conference on Computer Vision and Pattern Recognition (CVPR 2001) Kawai, HI, USA, pp. 511-518, 2001.
Dalal et al.: "Histograms of Oriented Gradients for Human Detection", International Conference on Computer Vision and Patter Recognition, vol. 2, pp. 886-893, Jun. 2005.
Lowe, "Object Recognition from Local Scale-Invariant Features", Proceedings of the International Conference on Computer Vision, vol. 2, ICCV '99, pp. 1150-, 1999.
International Search Report for PCT/EP2017/050111, dated May 31, 2017.
Written Opinion for PCT/EP2017/050111, dated May 31, 2017.
Villasenor, J. D., Belzer, B., & Liao, J. (1995). Wavelet filter evaluation for image compression. IEEE Transactions on image processing, 4(8), 1053-1060.
Aach, T. (2007). Comparative analysis of shift variance and cyclostationarity in multirate filter banks. IEEE Trans. on Circuits and Systems, 54(5), 1077-1087.
Doré, S., & Goussard, Y. (Oct. 1997). Experimental determination of CT point spread function anisotropy and shift-variance. In Engineering in Medicine and Biology Society, 1997. Proceedings of the 19th Annual International Conference of the IEEE (vol. 2, pp. 788-791). IEEE.
Kornfeld, G. H. (Sep. 1987). Digital Simulation Of Precise Sensor Degradations Including Non-Linearities And Shift Variance. In Infrared Image Processing and Enhancement (vol. 781, pp. 63-70). International Society for Optics and Photonics.

* cited by examiner

AUTOMATIC LIGHTING AND SECURITY DEVICE

FIELD OF THE INVENTION

The technical field of the invention is that of automatic lighting, and in particular that of the automatic lighting of an outside environment. The present invention relates to an automatic lighting device.

BACKGROUND

In order to illuminate an outside environment, it is known practise to use an automatic lighting device comprising a motion detector. The motion detector typically uses an infrared technology. When a motion is detected, the device activates lighting. When no motion is detected, the device deactivates the lighting.

Such a device does however present the drawback of not making any distinction between different categories of objects. The lighting is thus triggered as soon as a motion is detected, whether it is for example the motion of a pedestrian, of an animal, or of a vehicle. This creates unnecessary light pollution.

A number of prior art documents disclose image sensors that are capable of detecting and classifying moving objects or beings in a scene or region of interest (RoI) to generate a number of actions when one or more triggering events are identified. Such is the case of US patents and patent applications published under numbers U.S. Pat. No. 9,215,781, US2005002572, US2015062337.

But these devices and systems have some limitations notably because improved identification accuracy comes at the expense of either an increase in the number of false alarms or an increase in the computing power requirements or both. There is therefore a need for a device with an improved balance between high identification accuracy, low false alarms rate, low computing power requirement, especially in a home environment.

SUMMARY OF THE INVENTION

To this effect, the invention discloses a device comprising an image sensor, an IR light source, a visible light source and a processing unit configured to detect moving foreground elements of a scene, to track them and to classify them into different types of objects of interest that may trigger or not the illumination of the scene by the visible light source or an alarm.

More precisely, this invention discloses a device comprising: one or more infrared light sources; one or more visible light sources; an image sensor; a processing unit configured to analyze a series of images of a region of interest output by the image sensor; a control unit configured to generate one or more of an activation of the one or more visible light sources or an alarm based on a command received from the processing unit; wherein the analyze comprises detecting a moving foreground in the series of images of the region of interest, tracking one or more characterizing features in the moving foreground and classifying the one or more characterizing features into two of more types of objects of interest, a type of an object of interest determining a command sent by the processing unit to the control unit.

Advantageously, the device of the device of the invention is further connected to a network through a communication link, wherein the alarm is sent to a user device on the communication link.

Advantageously, the control circuit further triggers images of the object of interest to be sent to the user device on the communication link.

Advantageously, the detecting uses a Y luminance value in a YUV encoding of pixels in the series of images.

Advantageously, the detecting comprises comparing difference images between the series of images of the region of interest and images of a Background Model of said region of interest to threshold images, the threshold images being calculated dynamically using a Shifted Variance.

Advantageously, the tracking comprises allocating a Good Feature value to a characterizing feature in Bounded Blocks output by the detecting if a counter of correlated movements of the characterizing feature is increased and a counter of immobility is equal to zero.

Advantageously, the tracking further comprises creating a vignette with a Bounded Block having a number of Good Features higher than a threshold.

Advantageously, the classifying comprises using one or more of a Neural Network, a History of Oriented Gradient or a Support Vector Machine classifier.

Advantageously, the Neural Network is a Convolutional Neural Network classifier and comprises one or more Fully Connected Layers.

Advantageously, the camera comprises a lens and an infrared light and visible light sensor, the at least one infrared light source has a cone of emission of infrared light, the at least one visible light source has a cone of emission of visible light, there is no intersection between the lens of the camera on the one hand and the cones of emission of infrared light and of visible light on the other hand.

Advantageously, the lens has an axis of revolution A and comprises a first face having a normal vector oriented towards the sensor and a second face having a normal vector oriented towards the environment, and in which a first plane tangential to the first face and at right angles to the axis of revolution A defines a first half-space to which the sensor belongs and a second half-space to which the second face of the lens and the environment belong, and the cone of emission of the at least one infrared light source has a vertex arranged in the second half-space; the cone of emission of the at least one visible light source has a vertex arranged in the second half-space.

Advantageously, the at least one infrared light source has a cone of emission of axis A40, the at least one visible light source has a cone of emission of axis A50, and the camera has a cone of absorption of axis A, in the second half-space, the distance between the axis A40 and the axis A is constant or increasing when moving away from the first plane, and in the second half-space, the distance between the axis A50 and the axis A is constant or increasing when moving away from the first plane.

Advantageously, the device of the invention comprises a plurality of visible light sources, each visible light source having a cone of emission having an axis, wherein in the first half-space, for each visible light source of the plurality of visible light sources, the distance between the axis of the cone of emission of said source and the axis of the cone of emission of each other source is constant or increasing when moving away from the first plane.

Advantageously, the lens has an axis of revolution A, further comprising a protection element for the at least one infrared light source, for the at least one visible light source and for the lens of the camera, the protection element being transparent to the infrared light and to the visible light, the protection element extending substantially along a plane at right angles to the axis of revolution A.

The invention also discloses a method of monitoring a region of interest comprising: lighting the region of interest with one or more infrared light sources; capturing series of images of the region of interest by an image sensor; analyzing by a processing unit the series of images of the region of interest output by the image sensor; generating by a control unit one or more of an activation of one or more visible light sources or an alarm based on a command received from the processing unit; wherein the analyze comprises detecting a moving foreground in the series of images of the region of interest, tracking one or more characterizing features in the moving foreground and classifying the one or more characterizing features into two of more types of objects of interest, a type of an object of interest determining a command sent by the processing unit to the control unit.

The device of the invention also brings improved security to the location where it is installed.

In some embodiments it may be controlled remotely, possibly through the internet.

It is quite versatile because its software may be updated from time to time to improve detection, tracking or classification efficiency and thus still decrease the number of false positive and/or false negative.

By virtue of one aspect of the invention, the environment is lit with infrared light, in a range of wavelengths invisible to the human eye. The camera picks up an infrared light reflected by the environment and produces at least one image of the environment from the infrared light reflected by the environment.

The processing unit assigns, to at least a part of this image, at least one class out of a plurality of classes. In other words, one or more classes can be assigned to the entire image or to a part of the image. The control unit activates the visible light source as a function of the class assigned to each area of interest detected. A user can thus advantageously chose one or more classes for which he or she wants the lighting with visible light to be activated. The lighting with visible light remains deactivated for all the classes that the user has not chosen. The plurality of classes typically comprises:
  a first class for a given category, and
  a second class for everything which does not belong to the given category.
The plurality of classes can alternatively comprise three or more classes.

In addition to the features which have just been described in the above paragraph, the automatic lighting device according to one aspect of the invention can have one or more additional features out of the following, considered individually or in all technically possible combinations:
  The processing unit detects at least one area of interest within the image and assigns at least one class out of the plurality of classes to each area of interest detected. "Detection of at least one area of interest" should be understood to mean a search for at least one area of interest. The result of this search can be positive or negative. The result of this search is positive if at least one area of interest is detected. The result of this search is negative if no area of interest is detected.
  An area of interest can be an area exhibiting a motion. Alternatively, the area of interest can be a predefined area, and in particular an area predefined by a user.
  The camera films the environment lit by the at least one infrared light source to obtain a film of N images with N being a natural integer greater than or equal to 2, and the processing unit performs:
    for each pair of immediately consecutive images of the film, a detection of at least one area of interest exhibiting a motion;
    for each area of interest detected:
      a tracking in time of said area of interest so as to obtain a set of k thumbnail images of said area of interest with k being a natural integer less than or equal to N, each of the k thumbnail images comprising said area of interest, the k thumbnail images being extracted from k immediately consecutive images of the film;
      a choice of at least one thumbnail image out of the set of k thumbnail images;
      an application of a classification algorithm to the at least one thumbnail image chosen, for the assignment to the area of interest contained in the chosen thumbnail image of a class out of the plurality of classes.

A first image of the film, filmed at a time t1, and a second image of the film, filmed at a time t2 later than the time t1, are "immediately consecutive" if there is no image of the film filmed at a time t such that t1<t<t2.

A thumbnail image extracted from an image can have pixel dimensions less than or equal to the pixel dimensions of the image from which it is extracted.

One and the same area of interest which moves in the field of the camera appears on a plurality of k immediately consecutive images. For each image of the plurality of images, a thumbnail image is then defined which contains said area of interest. A plurality of N thumbnail images is obtained. The tracking of such an area of interest advantageously makes it possible to associate the plurality of N thumbnail images with said single area of interest. Detecting N areas of interest with a single thumbnail image associated with each of the N areas of interest is thus avoided.

Choosing a subset of p thumbnail images out of the plurality of N thumbnail images of said area of interest, with p being a natural integer such that: $1 \leq p < N$, and applying the classification algorithm to said subset of p thumbnail images chosen, rather than to the plurality of N thumbnail images, advantageously makes it possible to minimize the computation time linked to the operation of the classification algorithm. Choosing a subset of p thumbnail images out of the plurality of N thumbnail images of said area of interest also makes it possible to improve the accuracy of the classification algorithm, by providing the classification algorithm with an input datum of good quality. The subset of p thumbnail images can in fact be chosen, from the plurality of N thumbnail images, for its intrinsic qualities. In a complementary or alternative manner, the subset of p thumbnail images can be processed in order to improve the properties thereof.

According to a refinement, the step of detection, for each pair of immediately consecutive images of the film, of at least one area of interest exhibiting a motion comprises:
  a first substep according to which a set of areas in motion is detected, and
  a second substep according to which a filter is applied to the set of areas in motion previously detected, in order to eliminate at least one first type of motion.

The motion of a cloud and the motion of a tree branch stirred by the wind belong, for example, to the first type of motions.

Each thumbnail image of the set of k thumbnail images of each area of interest detected can be defined as being the smallest rectangle containing said area of interest detected. The size of each thumbnail image is thus minimized, which makes it possible to reduce the computation time linked to the operation of the classification algorithm. Alternatively, each thumbnail image of the set of k thumbnail images of each area of interest detected can be defined as being the smallest ellipse containing said area of interest detected, or as being the smallest polygon containing said area of interest detected. The dimensions of a thumbnail image can vary from one area of interest to another. The dimensions of a thumbnail image can also vary during the tracking of one and the same area of interest.

For each area of interest detected, the choice of the single thumbnail image out of the set of k thumbnail images is advantageously made as a function of a type of movement of said area of interest.

The device advantageously has a first mode of operation according to which the choice of the single thumbnail image is made from a subset of the set of k thumbnail images, the subset comprising the q first images of the set of k thumbnail images, with q being a natural integer less than or equal to 10, and preferentially less than or equal to 5. A high degree of responsiveness of the lighting device is thus advantageously made possible according to one aspect of the invention.

The camera comprising a lens and an infrared light and visible light sensor, the at least one infrared light source having a cone of emission of infrared light, and the at least one visible light source having a cone of emission of visible light, the device is advantageously such that there is no intersection between the lens of the camera on the one hand and the cones of emission of infrared light and of visible light on the other hand.

"There is no intersection between the lens of the camera on the one hand, and the cones of emission of infrared light and of visible light on the other hand" should be understood to mean the fact that, for a camera comprising a sensor and a lens, the lens having a first face oriented towards the sensor and a second face oriented towards the environment, the cone of emission of infrared light and the cone of emission of visible light do not reach the lens:
  either on its first face, or on its second face,
  either directly, or after a reflection on a protective element.

Any glare and any pollution of the lens of the camera by any one of the infrared or visible light sources is thus avoided.

The lens having an axis of revolution A and comprising a first face having a normal vector oriented towards the sensor and a second face having a normal vector oriented towards the environment, and a first plane tangential to the first face and at right angles to the axis of revolution A defining a first half-space to which the sensor belongs and a second half-space to which the second face of the lens and the environment belong, the device is advantageously such that:
  the cone of emission of the at least one infrared light source has a vertex arranged in the second half-space;
  the cone of emission of the at least one visible light source has a vertex arranged in the second half-space.

The lens having an axis of revolution A, the device advantageously comprises a protection element for the at least one infrared light source, for the at least one visible light source and for the lens of the camera, the protection element being transparent to the infrared light and to the visible light, the protection element extending substantially along a plane at right angles to the axis of revolution A. The device is thus made seal-tight, for use in an outside environment regardless of weather conditions. The integrity of the settings of the device in case of manipulation by a user is also guaranteed. Finally, the user manipulating the device is protected from any burns due to the infrared and visible light sources.

The at least one infrared light source having a cone of emission of axis A40, the at least one visible light source having a cone of emission of axis A50, and the camera having a cone of absorption of axis A, the device is advantageously such that:
  in the second half-space, the distance between the axis A40 and the axis A is constant or increasing when moving away from the first plane, and
  in the second half-space, the distance between the axis A50 and the axis A is constant or increasing when moving away from the first plane.

A reflection of infrared or visible light on the protection element reaching the lens, and in particular the second face of the lens, is thus avoided.

The device advantageously comprises a plurality of visible light sources, each visible light source having a cone of emission having an axis. In the first half-space, for each visible light source of the plurality of visible light sources, the distance between the axis of the cone of emission of said source and the axis of the cone of emission of each other source is advantageously constant or increasing when moving away from the first plane.

A region is thus obtained, in the second half-space, in which at least two cones of emission of visible light overlap. The uniformity of the lighting with visible light is thus improved, notably by eliminating any central halo.

The device advantageously comprises a plurality of infrared light sources, each infrared light source having a cone of emission having an axis. In the first half-space, for each infrared light source of the plurality of infrared light sources, the distance between the axis of the cone of emission of said source and the axis of the cone of emission of each other source is advantageously constant or increasing when moving away from the first plane.

A region is thus obtained, in the second half-space, in which at least two cones of emission of infrared light overlap. The uniformity of the lighting with infrared light is thus improved, notably by eliminating any central halo.

BRIEF DESCRIPTION OF THE DRAWINGS

The invention and its advantages will be better understood upon reading the following detailed description of a particular embodiment, given purely by way of non-limiting example, this description being made with reference to the accompanying drawings in which.

DETAILED DESCRIPTION

Figure 1:
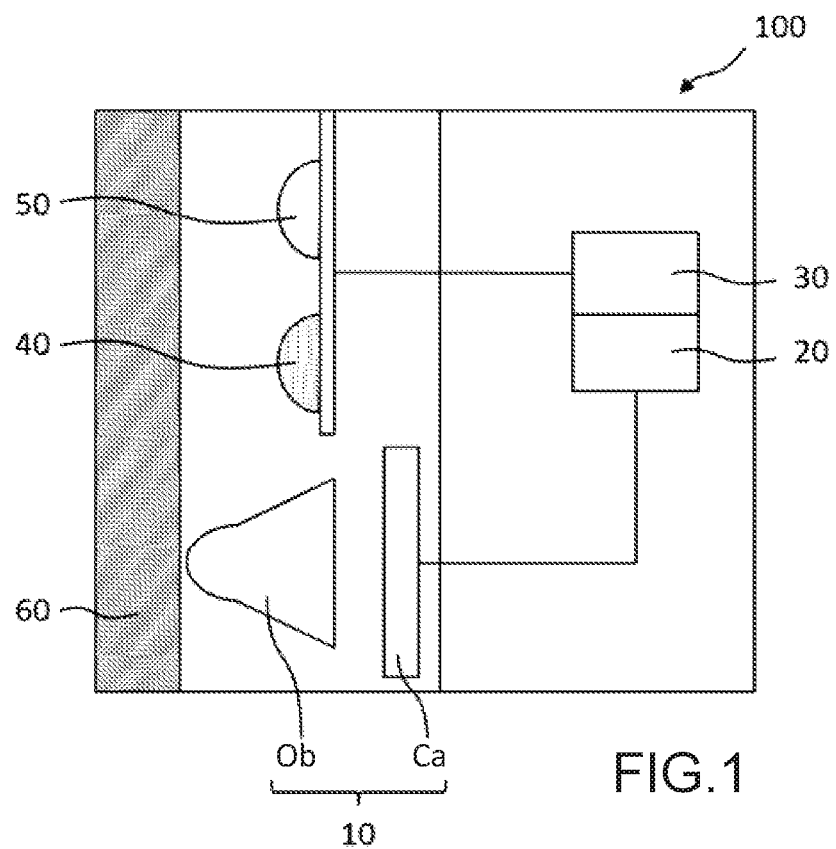
FIG. 1 shows a schematic representation of an automatic lighting device according to a first embodiment of the invention.

FIG. 1 shows a schematic representation of an automatic lighting device 100 according to a first embodiment of the invention. The device 100 comprises:
an infrared light source 40,
a camera 10 comprising a lens Ob and a sensor Ca,
a processing unit 20 for processing at least one image,
a visible light source 50,
a control unit 30 for controlling the visible light source 50, and
a protection element 60 for the infrared light source 40, for the visible light source 50 and for the lens Ob.

"Visible light" is typically understood to mean a light visible to a human user, that is to say a light whose wavelength belongs substantially to the range [380 nm; 780 nm]. "Infrared light" is typically understood to mean a light invisible to a human user and whose wavelength is greater than 780 nm. The infrared light source can be a light-emitting diode, or LED. Similarly, the visible light source can be an LED, or, alternatively, a halogen lamp or a neon lamp, etc. The visible light source, the infrared light source and the camera can be combined in a single module, as represented in FIG. 1. According to an alternative, the visible light source can be located in a first module, whereas the infrared light source and the camera are combined in a second module distinct from the first module. According to another alternative, the visible light source can be located in a first module, the infrared light source can be located in a second module distinct from the first module, and the camera can be located in a third module distinct from the first and second modules.

In a first mode of operation, the infrared light source 40 is activated permanently. In a second mode of operation, the infrared light source 40 can be deactivated. The first mode of operation is, for example, activated during the night. The second mode of operation is, for example, activated during the day. In the first mode of operation, an environment is thus lit with infrared light at each instant. The camera 10 can then film an environment lit with infrared light.

Each image filmed by the camera 10 is typically obtained by virtue of the infrared light reflected by the environment and arriving at the sensor Ca. The sensor Ca of the camera 10 is, for example, a CMOS sensor.

The processing unit 20 can, for example, be a microcontroller or a microprocessor. Similarly, the control unit 30 can, for example, be a microcontroller or a microprocessor. A single microcontroller or microprocessor can simultaneously comprise the processing unit 20 and the control unit 30.

The protection element 60 seals the device 100 and thus allows for its use in an outside environment, while being transparent to the infrared light and to the visible light.

Figure 2:
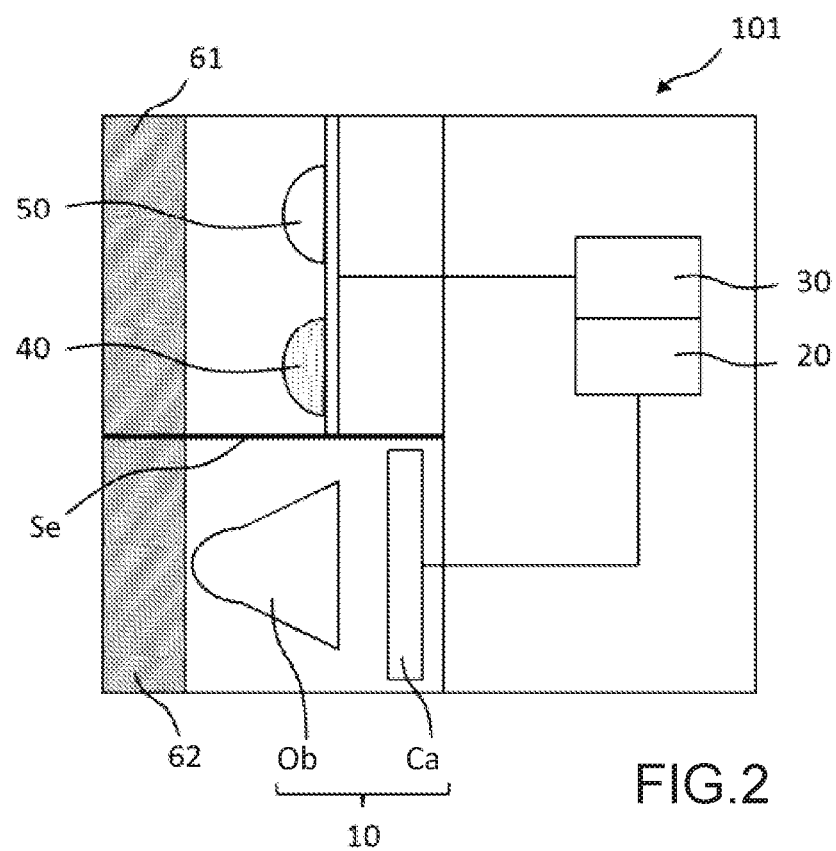
FIG. 2 shows a schematic representation of an automatic lighting device according to a second embodiment of the invention.

FIG. 2 shows a schematic representation of an automatic lighting device 101 according to a second embodiment of the invention. The device 101 according to the second embodiment of the invention comprises a separation element Se, which separates the infrared light source 40 and the visible light source 50 on the one hand, and the camera 10 on the other hand. The separation element Se makes it possible to prevent a radiation from the infrared light source 40 and/or a radiation from the visible light source 50 from reaching the sensor Ca of the camera 10.

According to the second embodiment of the invention, the protection element 60 is split up into a first part 61 for the protection of the infrared light source 40 and of the visible light source 50, and a second part 62 for the protection of the camera 10.

Figure 3:
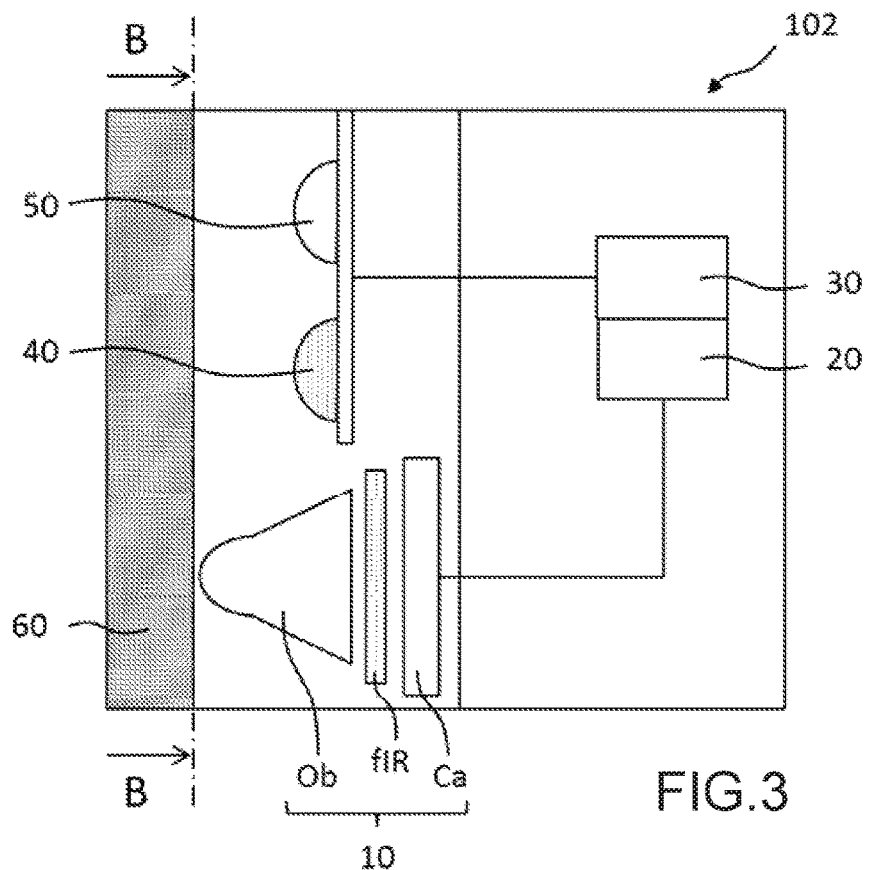
FIG. 3 shows a schematic representation of an automatic lighting device according to a third embodiment of the invention.

FIG. 3 shows a schematic representation of an automatic lighting device 102 according to a third embodiment of the invention. The device 102 according to the third embodiment of the invention comprises an infrared filter fIR. The infrared filter fIR can typically be arranged in a first position or in a second position, which are respectively illustrated in connection with FIGS. 4a and 4b.

Figures 4A, 4B:
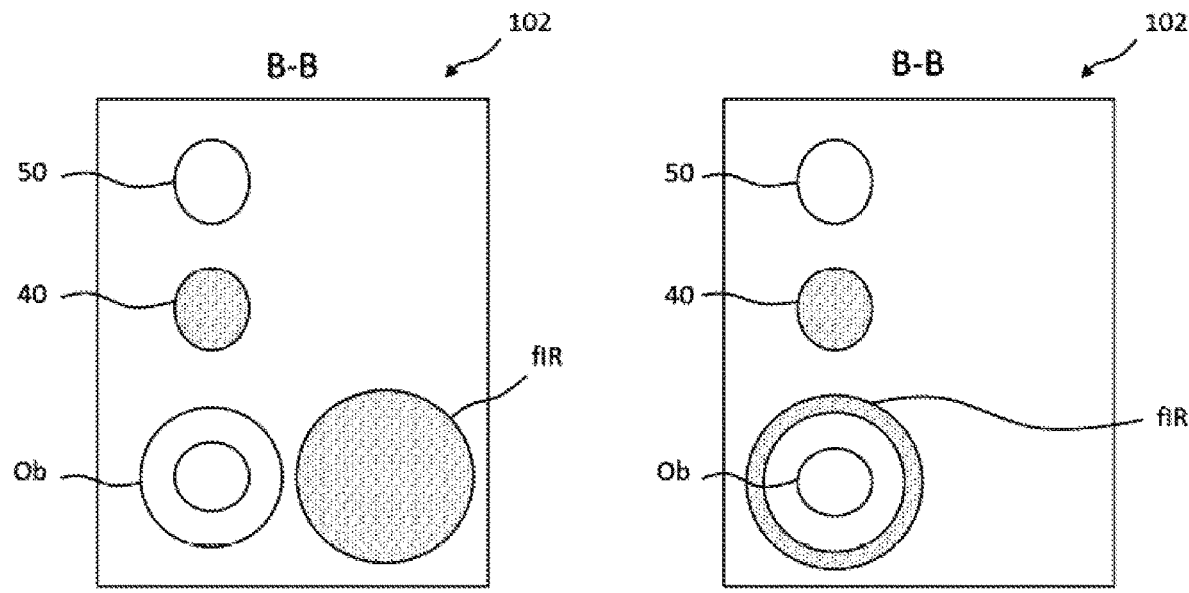
FIG. 4a shows a first cross-sectional view of the automatic lighting device according to the third embodiment of the invention.
FIG. 4b shows a second cross-sectional view of the automatic lighting device according to the third embodiment of the invention.

FIG. 4a shows a first cross-sectional view of the device 102 according to the third embodiment of the invention. FIG. 4a shows the infrared filter fIR arranged in the first position. In the first position, the infrared filter fIR is separated from the sensor Ca so that the infrared light can penetrate into the sensor Ca.

FIG. 4b shows a second cross-sectional view of the device 102 according to the third embodiment of the invention. FIG. 4b shows the infrared filter fIR arranged in the second position. In the second position, the infrared filter fIR is placed between the lens Ob and the sensor Ca of the camera 10 in order to prevent the infrared light from penetrating into the sensor Ca.

The automatic lighting device 102 according to the third embodiment can advantageously operate at any time of the day or of the night: the infrared filter fIR is placed in its first position during the night, and in its second position during the day. It is in fact desirable to cut the infrared light emitted by the sun during the day, in order to improve the rendering of the images picked up by the camera 10, for a human user.

The second and third embodiments which have just been described can be combined together, to obtain an automatic lighting device comprising the separation element Se and the infrared filter fIR.

Figure 5:
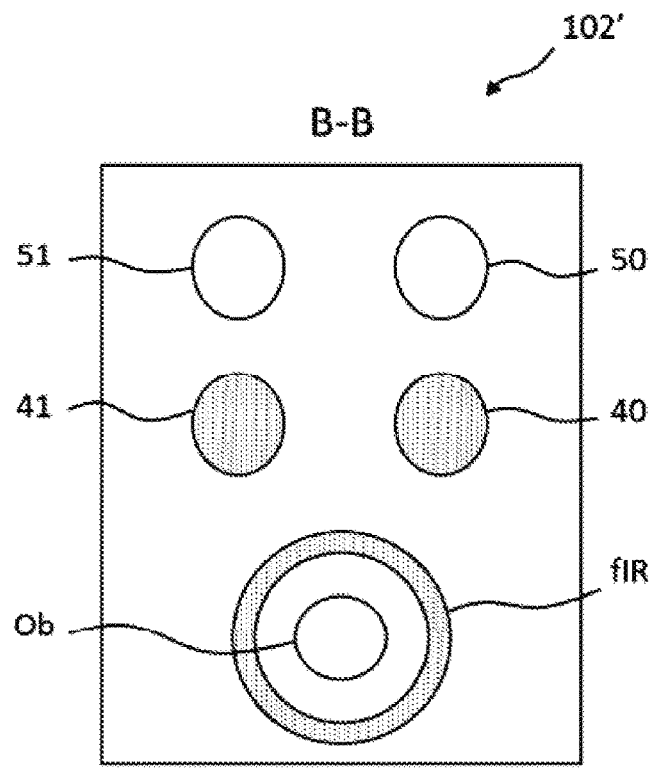
FIG. 5 shows a cross-sectional view of an automatic lighting device according to a variant of the third embodiment of the invention.

FIG. 5 shows a cross-sectional view of an automatic lighting device 102' according to a variant of the third embodiment of the invention. The automatic lighting device 102' comprises a plurality of infrared light sources and a plurality of visible light sources. In the particular example of FIG. 5, the plurality of infrared light sources comprises the infrared light source 40 and a second infrared light source 41. Alternatively, the plurality of infrared light sources can comprise three or more infrared light sources. Still in the particular example of FIG. 5, the plurality of visible light sources comprises the visible light source 50 and a second visible light source 51. Alternatively, the plurality of visible light sources can comprise three or more visible light sources.

The variant of the third embodiment which has just been described is compatible with the first and second embodiments. In other words:
- the device 100 according to the first embodiment can comprise, according to a variant, a plurality of infrared light sources and a plurality of visible light sources, and
- the device 101 according to the second embodiment can comprise, according to a variant, a plurality of infrared light sources and a plurality of visible light sources.

According to a second variant, not illustrated, of the first, second and third embodiments, the automatic lighting device can comprise a single infrared light source and a plurality of visible light sources. According to a third variant, not illustrated, of the first, second and third embodiments, the automatic lighting device can comprise a plurality of infrared light sources and a single visible light source.

The automatic lighting device according to one of the embodiments of the invention advantageously comprises an accelerometer. A motion of the automatic lighting device can thus be detected, in order to avoid, if necessary, an incorrect detection of a motion within the environment observed.

The automatic lighting device according to one of the embodiments of the invention advantageously comprises a communication interface making it possible to receive signals from at least one mobile terminal, and transmit signals to at least one mobile terminal. The communication interface can, for example, be a radiofrequency interface, or a Wi-Fi interface, or a Bluetooth interface, or a Zigbee interface, etc.

Figure 6:
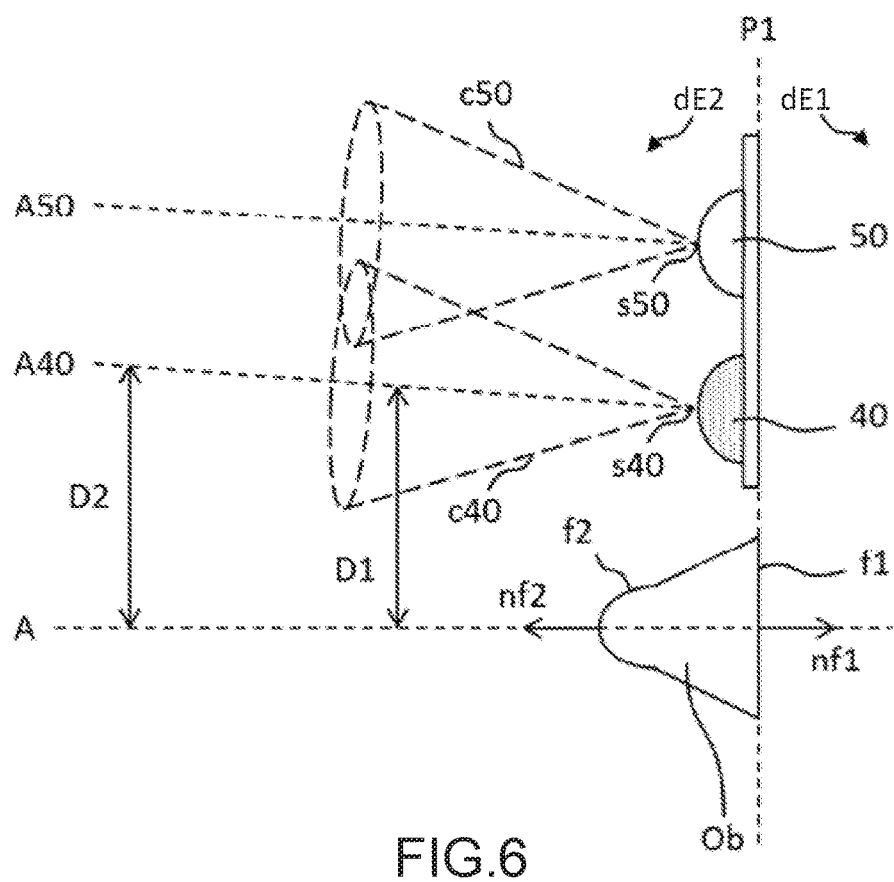
FIG. 6 shows a schematic representation of the arrangement of a lens, of a visible light source and of an infrared light source of an automatic lighting device according to an embodiment of the invention.

FIG. 6 shows a schematic representation of the arrangement of the lens Ob, of the visible light source 50 and of the infrared light source 40 of an automatic lighting device according to one of the embodiments of the invention. The lens Ob, which has an axis of revolution A, comprises:
- a first face f1 having a normal vector nf1 oriented towards the sensor Ca, and
- a second face f2 having a normal vector nf2 oriented towards the environment.

A first plane P1, tangential to the first face f1 and at right angles to the axis of revolution A of the lens Ob, defines:
- a first half-space dE1, to which the sensor Ca belongs, and
- a second half-space dE2, to which the second face f2 of the lens Ob and the environment belong.

FIG. 6 shows that:
- the visible light source 50 has a cone of emission c50, of axis A50 and of vertex s50, and
- the infrared light source 40 has a cone of emission c40, of axis A40 and of vertex s40.

In order for the cone of emission c50 of the visible light source 50 not to be incident on the first face f1 of the lens Ob, the visible light source 50 is advantageously arranged such that the vertex s50 of the cone of emission c50 is located in the second half-space dE2.

Similarly, in order for the cone of emission c40 of the infrared light source 40 not to be incident on the first face f1 of the lens Ob, the infrared light source 40 is advantageously arranged such that the vertex s40 of the cone of emission c40 is located in the second half-space dE2.

The automatic lighting device according to one of the embodiments of the invention preferentially comprises the protection element 60. The radiation emitted by the infrared light source 40 is likely to be partially reflected by the protection element 60. In order to avoid such a radiation reflected on the protection element 60 from reaching the second face f2 of the lens Ob, the infrared light source 40 is advantageously arranged such that, in the second half-space dE2, the distance between the axis A40 of the infrared light source 40 and the axis of revolution A of the lens Ob is constant or increasing when moving away from the first plane P1.

FIG. 6 shows, for example:
- a first distance D1 measured between the axis of revolution A of the lens and the axis A40 of the infrared light source 40, at a first distance from the first plane P1 in the second half-space dE2, and
- a second distance D2 measured between the axis of revolution A of the lens and the axis A40 of the infrared light source 40, at a second distance, greater than the first distance, from the first plane P1 in the second half-space dE2.

The second distance D2 is greater than or equal to the first distance D1.

Similarly, the radiation emitted by the visible light source 50 is likely to be partially reflected by the protection element 60. In order to avoid such a radiation reflected on the protection element 60 from reaching the second face f2 of the lens Ob, the visible light source 50 is advantageously arranged such that, in the second half-space dE2, the distance between the axis A50 of the visible light source 50 and the axis of revolution A of the lens Ob is constant or increasing when moving away from the first plane P1.

When the automatic lighting device according to an aspect of the invention comprises a plurality of visible light sources, each visible light source having a cone of emission, said plurality is preferentially arranged so as to obtain, in the second half-space dE2, a region in which at least two cones of emission of visible light overlap.

Similarly, when the automatic lighting device according to an aspect of the invention comprises as plurality of infrared light sources, each infrared light source having a cone of emission, said plurality is preferentially arranged so as to obtain, in the second half-space dE2, a region in which at least two cones of emission of infrared light overlap.

Figure 7:
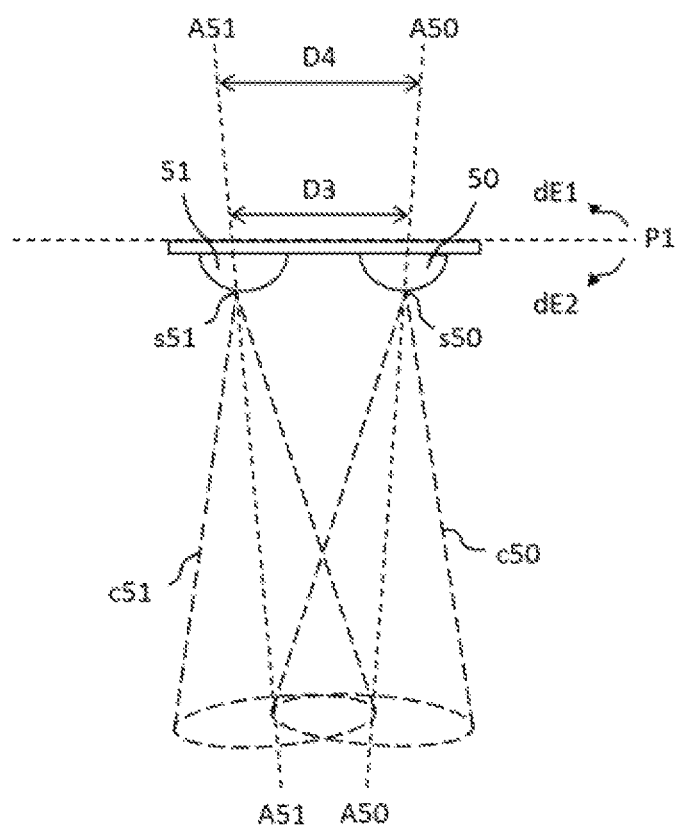
FIG. 7 shows a schematic representation of the arrangement of a first visible light source and of a second visible light source of an automatic lighting device according to an embodiment of the invention.

In this respect, FIG. 7 shows a schematic representation of the arrangement of the visible light sources of an automatic lighting device comprising a plurality of visible light sources. The device of FIG. 7 comprises:
- the visible light source 50 having the cone of emission c50, the axis A50 and the vertex s50, and
- the second visible light source 51 having a cone of emission c51, an axis A51 and a vertex s51.

The visible light source 50 and the second visible light source 51 are advantageously arranged so that, in the first half-space dE1, the distance between the axis A50 of the visible light source 50 and the axis A51 of the second visible light source 51 is constant or increasing when moving away from the first plane P1.

FIG. 7 shows, for example:
- a third distance D3 measured between the axis A50 of the visible light source and the axis A51 of the second visible light source, at a first distance from the first plane P1 in the first half-space dE1, and
- a fourth distance D4 measured between the axis A50 of the visible light source and the axis A51 of the second visible light source, at a second distance, greater than the first distance, from the first plane P1 in the first half-space dE1.

The fourth distance D4 is greater than or equal to the third distance D3.

The arrangement illustrated in FIG. 7 for a plurality of visible light sources can be transposed to a plurality of infrared light sources.

Figure 8:
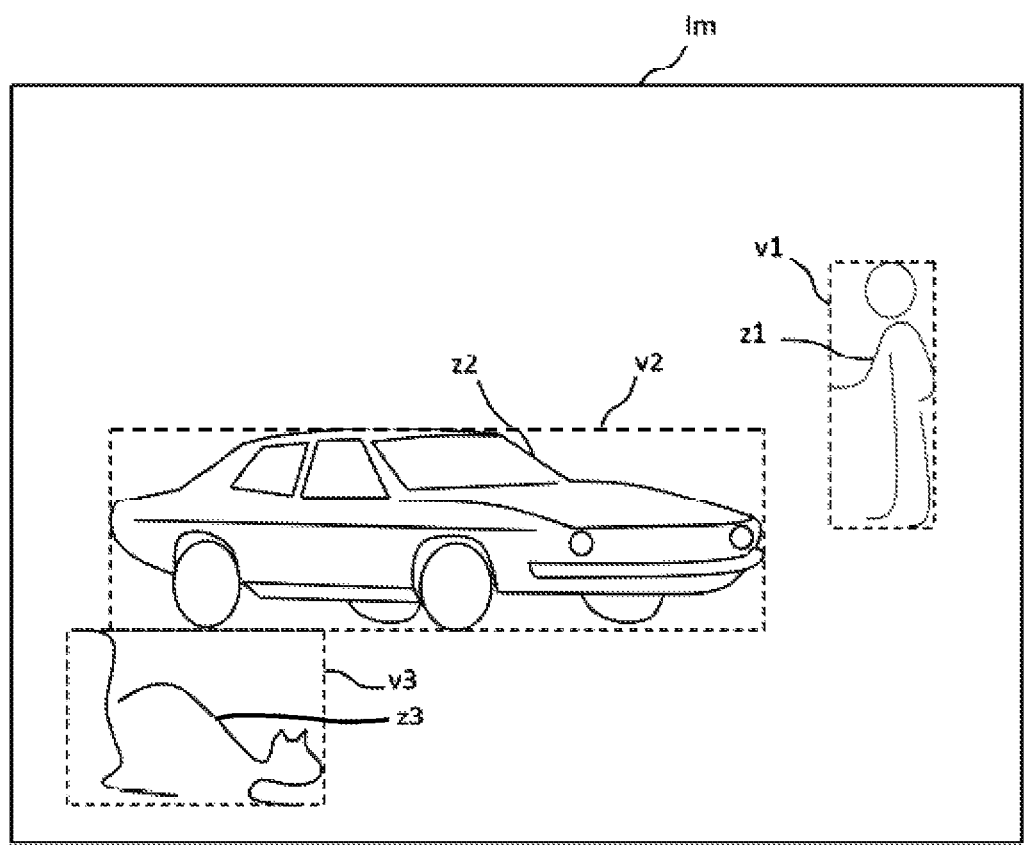
FIG. 8 shows a schematic representation of a processing of an image by a processing unit of an automatic lighting device according to an embodiment of the invention.

FIG. 8 shows a schematic representation of a processing of an image Im by the processing unit 20 of an automatic lighting device according to one of the embodiments of the invention. In the particular example represented in FIG. 8, the processing unit 20 detects first, second and third areas of interest z1, z2 and z3 in the image Im. The first area of interest z1 is, for example, a pedestrian in motion. The second area of interest z2 is, for example, a vehicle in motion. The third area of interest z3 is, for example, an animal in motion. The processing unit 20 defines a first thumbnail image v1 for the first area of interest z1, a second thumbnail image v2 for the second area of interest z2 and a third thumbnail image v3 for the third area of interest z3. The processing unit 20 assigns, to each area of interest, a class out of a plurality of classes. In a first example, the plurality of classes comprises:
  a first class concerning a first category, and
  a second class concerning all the elements not belonging to the first category.

According to the first example, the control unit 30 can activate the visible light source as soon as the first class is assigned to at least one thumbnail image.

The first category is, for example, that of pedestrians. Alternatively, the first category can be that of animals or of vehicles. In the case where the first category is that of pedestrians, the processing unit 20 assigns the first class to the first thumbnail image v1, and the second class to the second and third thumbnail images v2 and v3.

In a second example, the plurality of classes comprises:
  a first class concerning the first category,
  a second class concerning a second category distinct from the first category, and
  a third class concerning all the elements belonging neither to the first category nor to the second category.

In the case where the first category is that of pedestrians, the second category is, for example, that of animals or that of vehicles. According to the second example, the control unit 30 can activate the visible light source as soon as the first class is assigned to at least one thumbnail image or as soon as the second class is assigned to at least one thumbnail image.

In a third example, the plurality of classes comprises:
  a first class concerning the first category,
  a second class concerning the second category,
  a third class concerning a third category, and
  a fourth class concerning all the elements belonging neither to the first category, nor to the second category, nor to the third category.

In the case where the first category is that of pedestrians and where the second category is that of animals, the third category is, for example, that of vehicles. According to the third example, the control unit 30 can activate the visible light source as soon as the first class is assigned to at least one thumbnail image or as soon as the second class is assigned to at least one thumbnail image or as soon as the third class is assigned to at least one thumbnail image.

Figure 9:
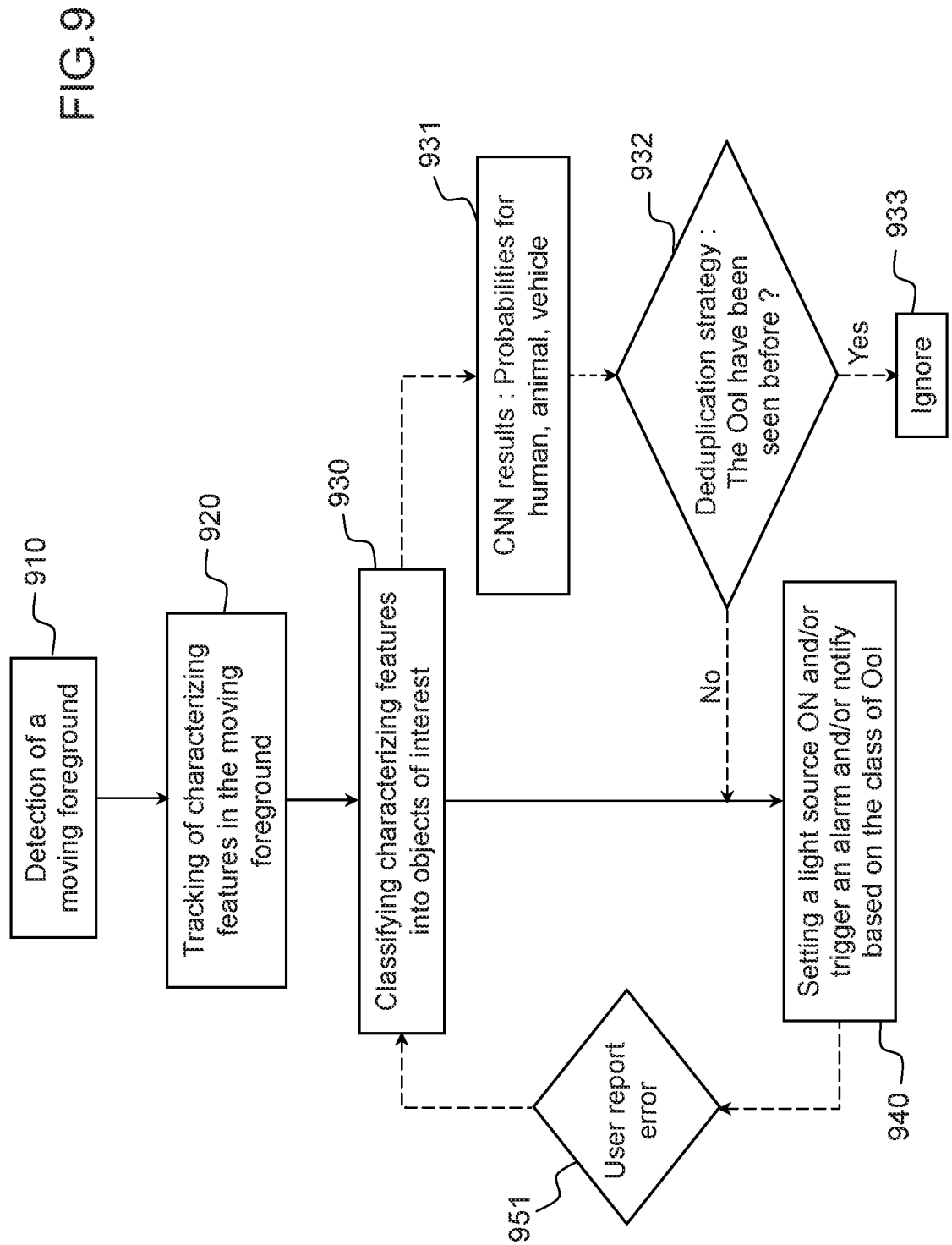
FIG. 9 displays a flow chart of an identification method using an image sensor according to the invention in a number of its embodiments.

FIG. 9 displays a flow chart of an identification method using an image sensor according to the invention in a number of its embodiments.

According to the invention, the lighting device 100 comprises a processing unit 20 that is configured to determine an object of interest that will trigger one or more actions. One of the actions is to set through a control unit 30 one or more sources 50, 51 of visible light ON or to leave it in an OFF state depending upon a type of the object of interest that is lighted by one or more infrared (IR) light sources 40, 41 and detected by an image sensor 10. Another possible action is to trigger an alarm that may be generated locally or sent to a remote location. The owner of the property where the device is installed or a watchman tasked with monitoring the property may then take appropriate action, based notably on the images captured by the image sensor 10 that may be sent to the owner or the watchman on a device using a communication link.

According to the invention, a number of steps have to be implemented before an appropriate command can be sent to the control unit.

The processing unit 20 comprises processing logic that may be embedded in the hardware of the lighting device or stored in a memory connected to the processing unit to determine if an event occurring in the field of view of the image sensor should or not trigger a command or an alarm.

The processing logic is configured to minimize the number of false alarms, maximize the number of true detection of alarming events and minimize the processing power used.

The inventors have determined that to achieve this optimization it is advantageous to use a processing architecture that implements three successive processing steps of image analysis:
  At a first step 910, a moving foreground is detected by separation from a still background by analyzing series of images from the sensor;
  At a second step 920, features of the detected moving foregrounds are tracked to confirm whether they are valid objects of interest;
  At a third step 930, the tracked valid objects of interest are classified into predetermined classes or types using a classifier that implements a deep learning technique.

Image analysis is a field of computer technology that is used to extract meaningful information from images. In the use case of preferred embodiments of the invention, it is applied to a scene surrounding a building that comprises Regions of Interest (RoI), i.e. regions where moving objects are detected and then classified into types of Objects of Interest (OoI) that are present in the scene. In-between the step of detection and the step of classifying, characterizing features of the moving objects are tracked.

In a variant of the invention, the output of the classifying step 930 that comprise probabilities of an object being an Object of Interest (OoI) of a predefined type (human, animal, car, etc. . . . ) may be further processed to de-duplicate the OoI to check if they have already been seen earlier. In this variant, the probabilities that an OoI belongs to one of a defined class are passed (step 931) to a de-duplication step 932. If the OoI has been seen before, the OoI is discarded and no action (setting the light source ON, triggering an alarm or sending a notification) is taken and the OoI is ignored (step 933). If the OoI has not been seen in a recent sequence of frames, one or more of the actions of setting the light source ON, triggering an alarm or notifying a user are performed (step 940). The time that is taken into account to determine that the OoI has been seen before is a matter of seconds. It may be user defined, or it may be defined by the memory allocation to this function in the device.

The appropriate command or alarm may be triggered with minimal false alarms and maximal true positives, having used a processing power that is consistent with the capacity of the processing unit in a time that is consistent with the use case.

In another variant, it may be proposed to some user to report classification errors. These errors are fed to the classifier to improve the probabilities of true classification and minimize false positives.

The operations performed at each of steps 910, 920 and 930 are described in detail further below respectively in relation with FIGS. 10, 11 and 12.

In some use cases, the classes or types of the objects of interest may for instance be: humans; animals; cars. But other classes may be added. Or only one class or two classes may be selected to trigger setting the lights ON or triggering an alarm.

Figure 10:
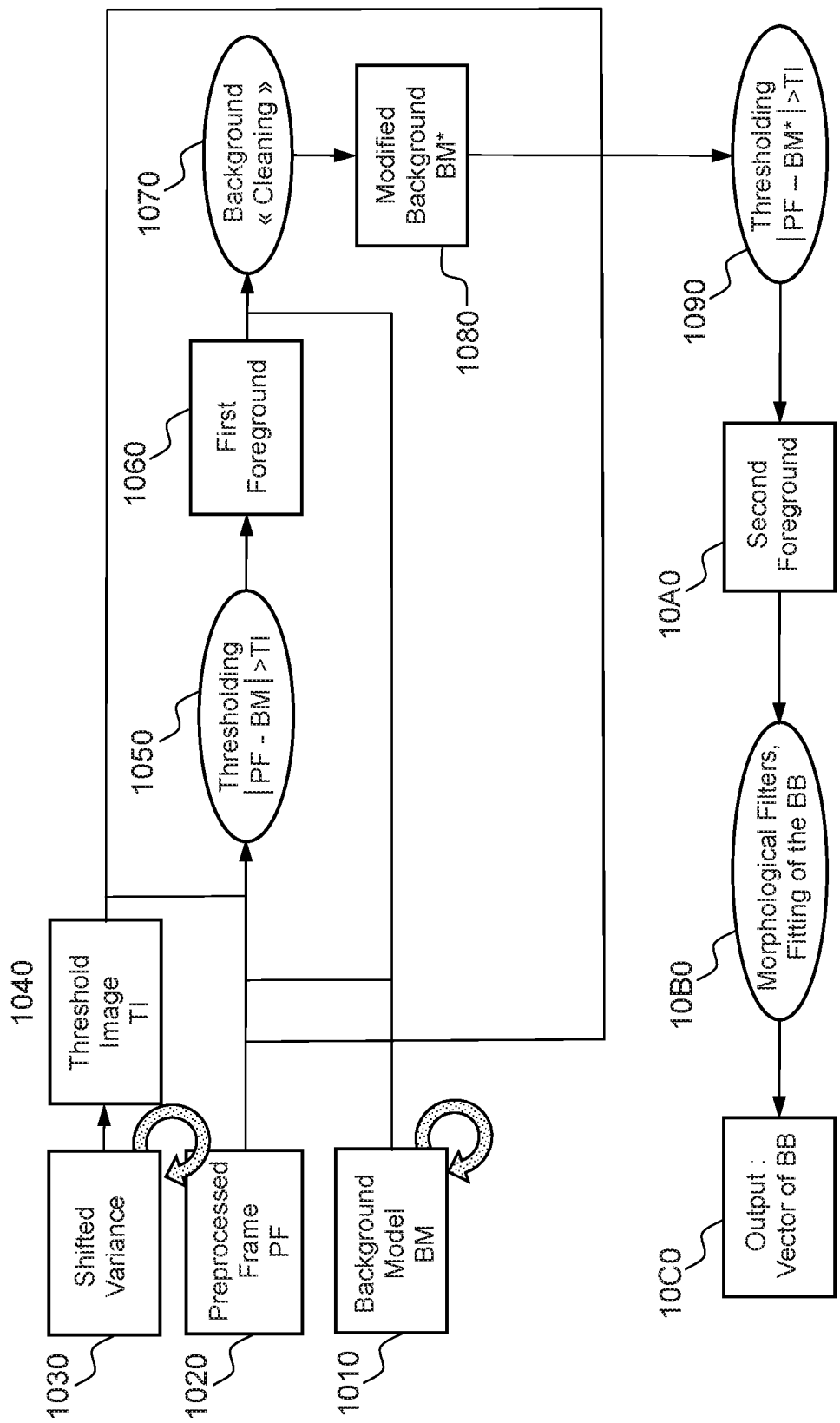
FIG. 10 displays a flow chart of a detection method of regions of interest in a scene according to some embodiments of the invention.

FIG. 10 displays a flow chart of a detection method of regions of interest in a scene according to some embodiments of the invention.

The purpose of the step of detection of regions of interest in a scene is to differentiate in a series of images of a scene a moving foreground, that will include the regions of interest, from a still background. The method consists in first modeling the background of the scene to provide an image of reference. Then, a comparison between the running image and the image of reference (i.e. background subtraction or foreground extraction) yields pixels labeled as "in movement". A designer of a method to efficiently perform this step will encounter a number of difficulties, notably:

- illumination changes, slow with the position of the sun or the moon during the day/night, or sudden with the movements of clouds in the sky;
- dynamic background, such as trees moving in the wind or traffic lights changing color;
- camouflage, when moving objects that do not contrast with the background scene;
- shadows, that may complicate the classification, typically when shape-based;
- changing background, e.g. when a still vehicle starts moving, a part of the scene that was so far considered as background will become moving foreground . . .
- image sensor noise, that may come from the sensor itself or from the image processing associated with it (notably compression) and will be reproduced at the output of the detection.

Other artifacts may also impact the quality of the detection, but the inventors believe that, having addressed the ones listed above, they have come to a detection method that is robust enough to face most of the artifacts that they have not specifically identified.

A first principle applied by the inventors is to update their Background Model (BM, 1010) often enough. BM is constructed from a number of frames preceding the current image frame that are stored in a FIFO ("First In First Out") memory. The size n of the used pixels in the FIFO should be small enough to avoid an impact of reasonably slow illumination changes and large enough to include parts of the scene that are not normally moving and should be considered as background. The inventors have determined experimentally that a duration of a few seconds (or 50 to 250 frames at 24 fps—i.e. frames per second) is a good compromise. Note that the Y luminance data in a YUV encoding by the image sensor processing is sufficient to extract information from a series of images of a scene to construct the BM.

An efficient BM may be built by making the assumption that pixels that take the luminance value of the median of the buffer belong to the background. But calculating a median of a series that varies over time is computationally complex. This is why, in a variant, the inventors use a rolling average of the series of pixel luminance values in the buffer.

To compute the rolling average, a number of selections of the pixels in the buffer may be made: either the p most recent corresponding pixels in the buffer or the p oldest pixels in the buffer, where p is the number of pixels selected to correspond to the number n of pixels in the FIFO determined to be optimal as explained above. It has been determined experimentally by the inventors that it is advantageous to select the option that yields the mean that is the closest to the current BM.

At a step 1050, a motion image is constructed by setting the luminance value of a pixel in a frame to 1 when the subtraction of the luminance of the corresponding pixel of the BM frame from the corresponding pixel in the input frame (that may be a preprocessed frame 1020, in case a cleansing of the frames is performed, i.e. to suppress noise as explained below) is higher than a calculated luminance of a corresponding pixel in a Threshold Image of the frame (TI), and setting this luminance value to 0 when this condition is not met.

Before running the 1050 test, a dynamic Threshold Image, TI, is calculated (step 1040). It has been determined by the inventors that a fixed threshold creates a large number of false negatives in shaded areas, whereas it is not the case in bright areas. To offset this undesirable effect, a Shifted Variance is calculated at a step 1040. The Shifted Variance is calculated at a step 1030, so that:

$$\forall s, \tau(s) = \alpha \left( \frac{\overline{s}}{255} \right)^{\beta} \sigma_{shifted}(s)$$

Where:
- s is the current pixel;
- τ(s) is the threshold corresponding to the current s pixel;
- $\sigma_{shifted}(s)$ is the Shifted Variance corresponding to the current s pixel;
- α, β are parameters that are selected based on an heuristic.

The heuristic is based on two considerations:
- In bright areas, the threshold should be higher;
- For pixels with a high variance, the threshold should also be higher.

The inventors have determined that setting the parameters α and β respectively at 30 and 3 will decrease the false negative rate in shaded areas without increasing the false positive rate in bright areas, but other values are possible.

In some embodiments of the invention, both the BM and the current frame may be blurred (i.e. their contrast diminished) through a preprocessing step (1020) to reduce the impact of noise.

The thresholding 1050 is the result of an extraction of the images such that: |PF−BM|>TI. This step produced a First Foreground frame 1060.

Then, in some embodiments of the invention, a Background Cleaning may be performed (1070) by subtracting from the current frame the First Foreground frame. This yields a Modified Background BM' (1080) with which a second thresholding may be performed (1090) to yield a Second Foreground frame (10A0).

Then, in some embodiments of the invention, a post-processing of the Second Foreground frame 10A0 may be performed at a step 1060. One of the goals of this step will be to eliminate parts of the image that may be noise and that are anyway too small to be properly classified. We can for instance determine the minimum size in pixel that is necessary to detect a person of 1.6 m height using opto-geometrical relationships such as:

$$h_m = \frac{HW}{2\tan\theta \times D_M}$$

where:
- H is the minimum height of the object or person we want to detect;
- W is the width in pixels of the frame;
- θ is half the horizontal angle of view;
- $D_M$ is the maximum distance of detection.

With an image sensor of 5 M pixels the minim size of objects of 1.6 m height that will be detectable with the sensor from 20 m is about 100 pixels. Combining minimum height and width allows defining a structuring element or Bounding Box (BB). Objects in the foreground of a size lower than BB but close enough will be grouped, whereas those of also a size lower than BB but isolated will be filtered out.

The output of the detection process is a set of BB vectors 10C0 that are passed to the tracking process.

The detection process of the invention is remarkable notably in that it considers only the grey levels of the image pixels and compensates for the "ghosting" effect in calculating a shifted variance.

The detection process of the invention has been described with a number of specific features, but it is to be understood that a number of them are optional, in the sense that they may improve the performance, but are not mandatory to achieve an acceptable result.

Figure 11:
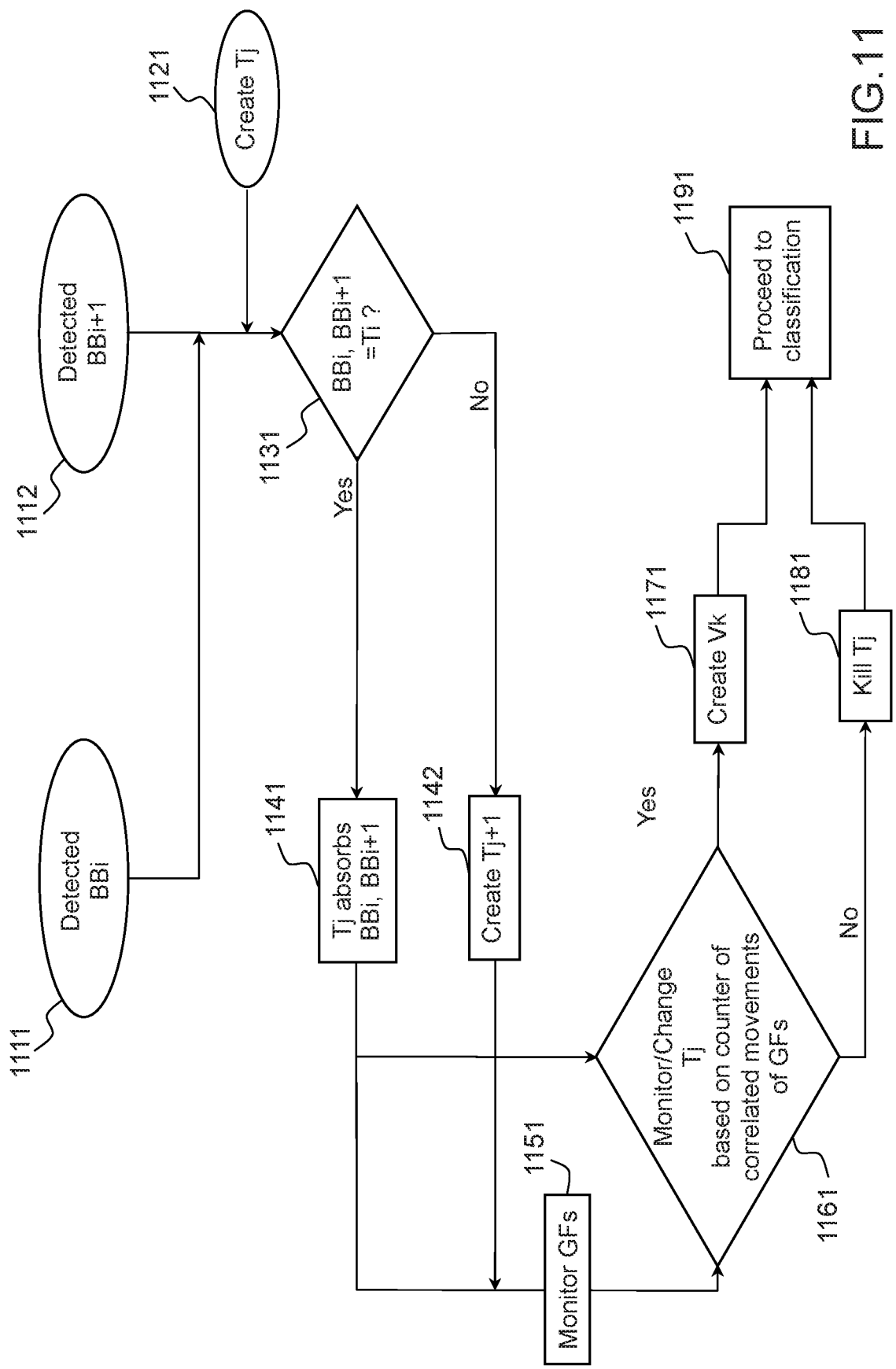
FIG. 11 displays a flow chart of a tracking method of regions of interest that have been detected in a scene according to some embodiments of the invention.

FIG. 11 displays a flow chart of a tracking method of regions of interest that have been detected in a scene according to some embodiments of the invention.

The detection process described above notably presents the advantage of allowing loosing some BBs. Accordingly, the tracking may be simpler than those of the prior art.

The tracking process of the invention is derived from a method described in Bouguet ("Pyramidal Implementation of the Lucas Kanade Feature Tracker", Intel Corp. Microprocessor Research Labs, 2000). This process builds on Lucas and Kanade, "An Iterative Image Registration Technique with an Application to Stereo Vision", Proceedings of the 7$^{th}$ International Joint Conference on Artificial Intelligence, Vol. 2, IJCAI '81, pp. 674-679, 1981, and on Tomasi and Shi, "Good Features to Track", 1994 I3E Conference on Computer Vision and Pattern Recognition, CVPR '94, pp. 593-600, 1994.

In some embodiments of the invention, at each foreground extraction output from the detection process, detected BBs are compared with existing trackers' locations, leading to the creation of new trackers when a comparable tracker is not yet present in the plurality of existing trackers. The trackers search for Good Features (GFs) in the BBs attributed to them. The GFs are then followed from frame to frame using a modified pyramidal Lucas Kanade feature tracker described in the references cited above. The algorithm used is of the type described below:

An equation of the form Zd=e has to be solved where Z is a 2×2 matrix computed on the image, d is the translation that is to be found, e is an error vector.

Matrix has to satisfy a minimization criterion of its eigen values $\lambda_1$ and $\lambda_2$: Min($\lambda_1$, $\lambda_2$)>λ where λ is a threshold selected appropriately by trial and error.

Then, the minimal error vector is calculated by using the following formula:

$$e = \iint_W [J(A(Ax+d)) - I(x)]^2 w(x) dx$$

where w is a weighting function that has to be selected to minimize e in order to find the transformation of the window W from frame I to frame J. This allows discriminating between real physical points and depth discontinuities or other unreliable points, such as occluding features that actually move independently or that are produced by reflections of light.

According to some embodiments of the invention, the tracking process may be implemented through the following steps.

At steps 1111, 1112, Bounded Block $BB_i$, $BB_{i+1}$ output by the detection process are acquired by the tracking process. At a step 1121, a tracker $T_j$ is created as a result of previous steps (not illustrated on the figure). At a step 1131, $BB_i$, $BB_{i+1}$ are compared to $T_j$. If the comparison tests are successful, $T_j$ absorbs $BB_i$ and/or $BB_{i+1}$ (1141). If the comparison tests fail, a new tracker $T_{j+1}$ is created (1142).

The GFs in the trackers $T_j$, $T_{j+1}$ are updated and monitored using (1151), in some embodiments of the invention, the following data:
- their coordinates;
- their last and before last displacements;
- a number of motion-related counters.

The motion-related counters may comprise a counter of correlated movements that may be incremented when the last and before last displacements are about in the same direction. They may also comprise a counter of immobility that may be incremented when the last displacement is below a threshold and set to zero when it is above this threshold. Then, a number of states may be defined (for instance, valid, neutral and bad) to decide whether a feature's movement in a tracker qualifies the said feature to be a GF.

Then, at a step 1161, a number of decisions are made by the tracking algorithm: when the state is bad, the feature is killed; new GFs are also created based on the same heuristic, if they are close enough to other GFs. Trackers may also be merged.

Then, at a step 1171, Vignettes $V_k$ are created with the trackers having sufficient number of GFs. In some embodiments of the invention, the vignettes may be ranked by an index of quality.

The tracking process of the invention is remarkable in that it yields better results than the tracking processes of the prior art cited above, notably in a use case that may characterized by a variety of objects to be tracked that are possibly moving at different speeds and on a blurred background.

The tracking process of the invention has been described with a number of specific features, but it is to be understood that a number of them are optional, in the sense that they may improve the performance, but are not mandatory to achieve an acceptable result.

Figure 12:
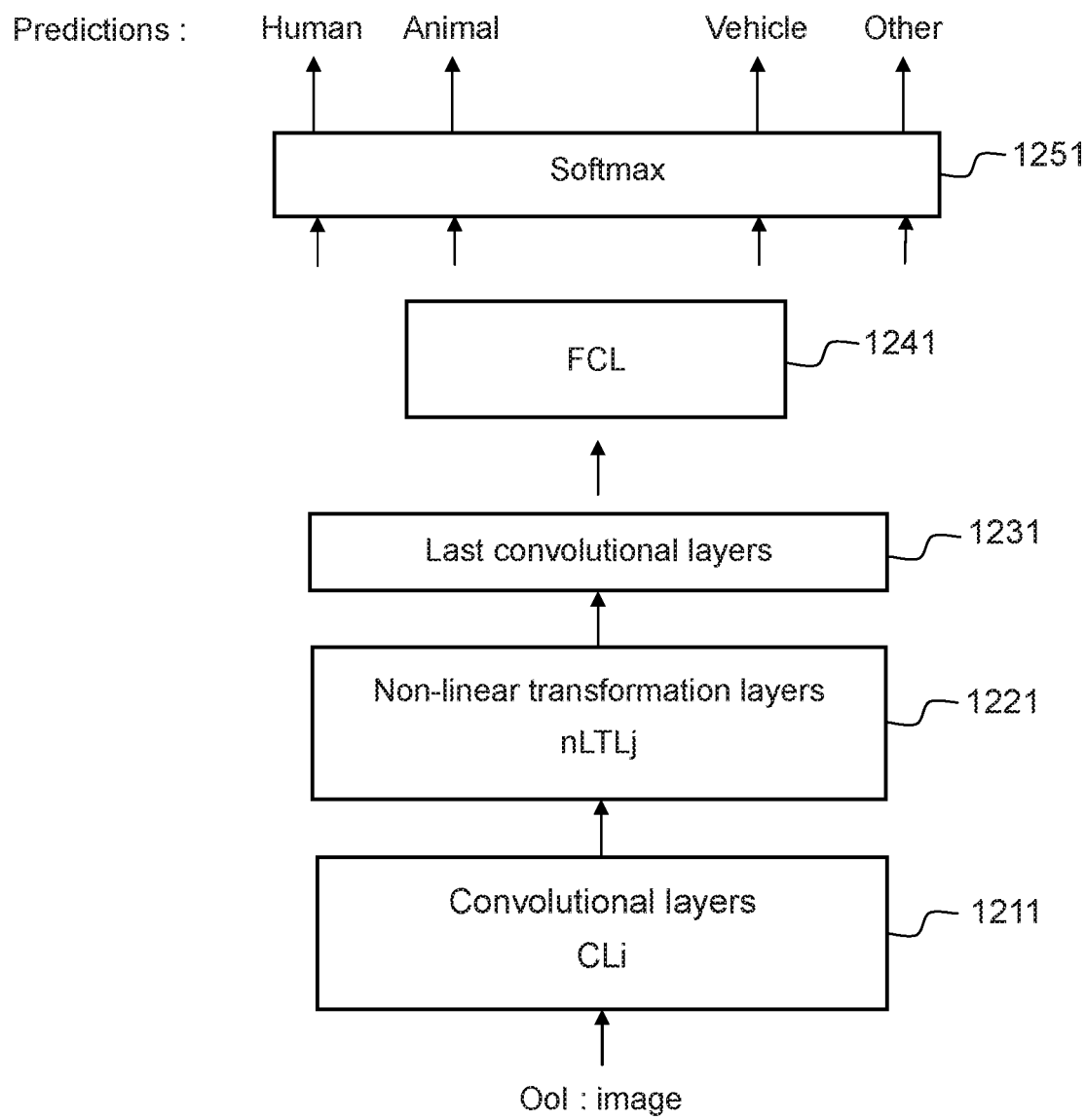
FIG. 12 displays an architecture of a learning/classification process of regions of interest that are tracked in a scene according to some embodiments of the invention.

FIG. 12 displays an architecture of a learning/classification process of regions of interest that are tracked in a scene according to some embodiments of the invention.

According to some embodiments of the invention, a deep learning classification technique based on convolutional neural networks (CNN) is used. The assumption that a CNN classifier is well suited to the problem to be solved is based on the idea that patterns that are present in a vignette have a significant probability to be present elsewhere. Also, a CNN is a multi-stage learning method where the neurons are locally connected and not connected to all the layers of the network. Groups of neurons sharing the same parameters are spread out regularly to cover the entire image. This allows a more computationally efficient processing.

A description of a CNN classifier of the prior art may be found in Garschik and alii, "Rich Feature Hierarchies for Accurate Object Detection and Semantic Detection", 2014 I3E Conference on Computer Vision and Pattern Recognition, CVPR 2014, Colombus, Ohio, USA, pp. 580-587, 2014.

Classification and learning are performed by a CNN at the same time. A number of different architectures of CNN may be used to implement the invention. The architecture presented on figure is therefore illustrative only and not limitative. Also, it is possible to implement the invention with a classification method that is different from a CNN. For example, a method described in Viola and alii "Rapid Object Detection Using a Boosted Cascade of Simple Features", 2001 I3E, Computer Society Conference on Computer Vision and Pattern Recognition (CVPR 2001), Kawai, Hi., USA, pp. 511-518, 2001, or in Dalal et alii "Histograms of Oriented Gradients for Human Detection", International Conference on Computer Vision and Patter Recognition, vol. 2, pp. 886-893, June 2005, or in Lowe, "Object Recognition from Local Scale-Invariant Features", Proceedings of the International Conference on Computer Vision, vol. 2, ICCV '99, pp. 1150-, 1999.

In some embodiments of the invention, the CNN used to classify the objects of interest detected, tracked and conditioned into Vignettes $V_k$ comprises:

A number of Convolutional Layers ($CL_j$), 1211, wherein convolutional products are applied to the input vignettes using kernel matrices of dimensions 1×1, 3×3, 5×5 and 1×1; these dimensions have been tested as adapted to some exemplary use cases of the invention, but they may be set at different values; A number of non-Linear Transformation Layers ($nLTL_j$), 1221 are also provisioned; examples of nLTLs are: a Depth Concatenation to normalize the output of the CLs;

a Pooling Layer to reduce the size of the problem by grouping a number of parameters; a Drop_Out Layer to eliminate elements that do not add information that is useful to improve the quality of the classification. Further operations are performed by a Fully Connected Layer (FCL, 1241); FCL are similar to CL in the sense that they apply a convolution product to their input, but their kernel has the dimensions of the input vignette; it has been observed by the inventors that it is advantageous to use a single FCL; but in some use cases, it is possible to use as many FCLs as classes of interest, each FCL dedicated to one of the "hyper-classes" that are one of the use case of the invention, i.e. Humans (HC_H), Animals(HC_A), Cars(HC_C);

Finally, for the output of each FCL, predictions of the probability that the class of a vignette $V_k$ is a human, an animal or a vehicle are determined using a softmax cost function 1251 to adjust the coefficients of the Active Layers of the CNN that are applied; the softmax cost function cannot be solved analytically is most cases; one may use for instance a gradient descent or a backpropagation algorithm to solve the softmax cost function at each iteration.

A number of parameters of the various modules of the CNN may be tuned by trial and error to adjust performance in terms of the best compromise between true and false positive and processing power needed, for instance the size of the input vignettes, the dimensions of the kernels of the CLs, the use of a cascading approach to eliminate the false positives, the initialization of the FCL to increase the speed of convergence. For instance a matrix of 112×112 pixels for the vignette at the output of the tracking process has been determined to be a good choice.

The examples disclosed in this specification are only illustrative of some embodiments of the invention. They do not in any way limit the scope of said invention which is defined by the appended claims.

The invention claimed is:

1. A device comprising:
   one or more infrared light sources;
   one or more visible light sources;
   an image sensor;
   a processing unit configured to analyze a series of images of a region of interest output by the image sensor;
   a control unit configured to generate one or more of an activation of the one or more visible light sources or an alarm based on a command received from the processing unit;
   wherein the analyzing comprises detecting a moving foreground in the series of images of the region of interest, tracking one or more characterizing features in the moving foreground and classifying the one or more characterizing features into two of more types of moving objects of interest, a type of a moving object of interest determining a command sent by the processing unit to the control unit; and
   wherein the detecting comprises comparing difference images between the series of images of the region of interest and images of a Background Model of said region of interest to threshold images, the threshold images being calculated dynamically using a shift-variance, and the tracking comprises allocating a Good Feature value to a characterizing feature in Bounded Blocks output by the detecting if a counter of correlated movements of the characterizing feature is increased and a counter of immobility is equal to zero.

2. The device of claim 1, further connected to a network through a communication link, wherein the alarm is sent to a user device on the communication link.

3. The device of claim 2, wherein the control unit further triggers images of the moving object of interest to be sent to the user device on the communication link.

4. The device of claim 1, wherein the detecting uses a Y luminance value in a YUV encoding of pixels in the series of images.

5. The device of claim 1, wherein the tracking further comprises creating a vignette with a Bounded Block having a number of Good Features higher than a threshold.

6. The device of claim 5, wherein the classifying comprises using one or more of a Neural Network, a History of Oriented Gradient or a Support Vector Machine classifier.

7. The device of claim 6, wherein the Neural Network is a Convolutional Neural Network classifier and comprises one or more Fully Connected Layers.

8. The device of claim 1, wherein:
   the camera comprises a lens and an infrared light and visible light sensor,
   the at least one infrared light source has a cone of emission of infrared light,
   the at least one visible light source has a cone of emission of visible light,
   there is no intersection between the lens of the camera on the one hand and the cones of emission of infrared light and of visible light on the other hand.

9. The device of claim 8, wherein the lens has an axis of revolution A and comprises a first face having a normal vector oriented towards the sensor and a second face having a normal vector oriented towards the environment, and in which a first plane tangential to the first face and at right angles to the axis of revolution A defines a first half-space to which the sensor belongs and a second half-space to which the second face of the lens and the environment belong, and:

the cone of emission of the at least one infrared light source has a vertex arranged in the second half-space;

the cone of emission of the at least one visible light source has a vertex arranged in the second half-space.

10. The device of claim 9, wherein:

the at least one infrared light source has a cone of emission of axis A40, the at least one visible light source has a cone of emission of axis A50, and the camera has a cone of absorption of axis A, in the second half-space, the distance between the axis A40 and the axis A is constant or increasing when moving away from the first plane, and in the second half-space, the distance between the axis A50 and the axis A is constant or increasing when moving away from the first plane.

11. The device of claim 5, comprising a plurality of visible light sources, each visible light source having a cone of emission having an axis, wherein in the first half-space, for each visible light source of the plurality of visible light sources, the distance between the axis of the cone of emission of said source and the axis of the cone of emission of each other source is constant or increasing when moving away from the first plane.

12. The device of claim 5, wherein the lens has an axis of revolution A, further comprising a protection element for the at least one infrared light source, for the at least one visible light source and for the lens of the camera, the protection element being transparent to the infrared light and to the visible light, the protection element extending substantially along a plane at right angles to the axis of revolution A.

13. A method of monitoring a region of interest comprising:

lighting the region of interest with one or more infrared light sources;

capturing series of images of the region of interest by an image sensor;

analyzing by a processing unit the series of images of the region of interest output by the image sensor;

generating by a control unit one or more of an activation of one or more visible light sources or an alarm based on a command received from the processing unit;

wherein the analyzing comprises detecting a moving foreground in the series of images of the region of interest, tracking one or more characterizing features in the moving foreground and classifying the one or more characterizing features into two of more types of moving objects of interest, a type of a moving object of interest determining a command sent by the processing unit to the control unit; and wherein the detecting comprises comparing difference images between the series of images of the region of interest and images of a Background Model of said region of interest to threshold images, the threshold images being calculated dynamically using a shift-variance, and the tracking comprises allocating a Good Feature value to a characterizing feature in Bounded Blocks output by the detecting if a counter of correlated movements of the characterizing feature is increased and a counter of immobility is equal to zero.

14. A device comprising:

one or more infrared light sources;

one or more visible light sources;

an image sensor;

a processing unit configured to analyze a series of images of a region of interest output by the image sensor;

a control unit configured to generate one or more of an activation of the one or more visible light sources or an alarm based on a command received from the processing unit;

wherein the analyzing comprises detecting a moving foreground in the series of images of the region of interest, tracking one or more characterizing features in the moving foreground and classifying the one or more characterizing features into two of more types of moving objects of interest, a type of a moving object of interest determining a command sent by the processing unit to the control unit, wherein:

the camera comprises a lens and an infrared light and visible light sensor, the at least one infrared light source has a cone of emission of infrared light, the at least one visible light source has a cone of emission of visible light, there is no intersection between the lens of the camera on the one hand and the cones of emission of infrared light and of visible light on the other hand.

* * * * *